US008803444B2

(12) United States Patent
Ding et al.

(10) Patent No.: US 8,803,444 B2
(45) Date of Patent: Aug. 12, 2014

(54) METHOD AND SYSTEM OF CONTROLLING ILLUMINATION CHARACTERISTICS OF A PLURALITY OF LIGHTING SEGMENTS

(75) Inventors: Ang Ding, Shanghai (CN); Xiaoyan Zhu, Shanghai (CN); Gongming Wei, Shanghai (CN); Hugo Johan Cornelissen, Waalre (NL)

(73) Assignee: Koninklijke Philips N.V., Eindhoven (NL)

( * ) Notice: Subject to any disclaimer, the term of this patent is extended or adjusted under 35 U.S.C. 154(b) by 337 days.

(21) Appl. No.: 13/132,330

(22) PCT Filed: Nov. 26, 2009

(86) PCT No.: PCT/IB2009/055346
§ 371 (c)(1),
(2), (4) Date: Jun. 2, 2011

(87) PCT Pub. No.: WO2010/064168
PCT Pub. Date: Jun. 10, 2010

(65) Prior Publication Data

US 2011/0234121 A1 Sep. 29, 2011

(30) Foreign Application Priority Data

Dec. 5, 2008 (CN) .......................... 2008 1 0177114

(51) Int. Cl.
*G05F 1/00* (2006.01)
*F21V 7/22* (2006.01)
*G02B 6/26* (2006.01)

(52) U.S. Cl.
USPC ........... 315/307; 315/316; 315/294; 362/607; 362/276; 385/31; 385/36

(58) Field of Classification Search
USPC ......... 362/276, 607, 231, 230, 227, 488, 464, 362/465; 315/291, 307, 294, 312, 149; 385/31, 36, 146
See application file for complete search history.

(56) References Cited

U.S. PATENT DOCUMENTS 6,414,760 B1 7/2002 Lopez et al.
6,498,440 B2 * 12/2002 Stam et al. .................... 315/291
7,062,125 B2 6/2006 Cournoyer et al.
7,119,501 B2 10/2006 Young
7,140,752 B2 * 11/2006 Ashdown ...................... 362/276
7,181,096 B2 2/2007 Matsumoto et al.

(Continued)

FOREIGN PATENT DOCUMENTS

WO 0247438 A2 6/2002
WO 2007019663 A1 2/2007

*Primary Examiner* — Vibol Tan
(74) *Attorney, Agent, or Firm* — Yuliya Mathis

(57) ABSTRACT

The invention provides a method and system of controlling illumination characteristics of a plurality of lighting segments. According to the invention, there is provided an illumination system, comprising: a plurality of lighting segments; a detecting subsystem configured to detect an illumination intensity and/or color of lights emitted from each lighting segment; a controller configured to receive the detecting subsystem's output signals representing illumination intensity and/or color of lights emitted from each lighting segment and to generate sets of driving signals to respectively adjust the driving currents of each lighting segment in response to the output signals, so as to adjust the illumination intensity and/or color of the lights emitted from each lighting segment in accordance with a predetermined illumination setting, wherein each set of driving signals has a unique period feature which is distinguished from that of other sets of driving signals corresponding to other lighting segments.

8 Claims, 6 Drawing Sheets

(56) References Cited

U.S. PATENT DOCUMENTS

| | | | | |
|---|---|---|---|---|
| 7,385,572 | B2 | 6/2008 | Yu et al. | |
| 7,497,590 | B2 * | 3/2009 | Rains et al. | 362/231 |
| 7,521,667 | B2 * | 4/2009 | Rains et al. | 250/228 |
| 7,687,753 | B2 * | 3/2010 | Ashdown | 250/205 |
| 2003/0230991 | A1 * | 12/2003 | Muthu et al. | 315/307 |
| 2004/0252483 | A1 * | 12/2004 | Cheng | 362/31 |
| 2006/0061288 | A1 | 3/2006 | Zwanenburg et al. | |
| 2006/0237636 | A1 | 10/2006 | Lyons et al. | |
| 2006/0245174 | A1 | 11/2006 | Ashdown et al. | |
| 2007/0127266 | A1 | 6/2007 | Sugiura | |
| 2007/0215893 | A1 * | 9/2007 | Liao et al. | 257/98 |
| 2007/0216704 | A1 | 9/2007 | Roberts et al. | |
| 2010/0317777 | A1 * | 12/2010 | Bowen et al. | 524/109 |

* cited by examiner

METHOD AND SYSTEM OF CONTROLLING ILLUMINATION CHARACTERISTICS OF A PLURALITY OF LIGHTING SEGMENTS

FIELD OF THE INVENTION

The present invention relates to illumination field, especially to a method and system of controlling illumination characteristics of a plurality of lighting segments. The invention further relates to a light guide means, which can be used in the system and method.

BACKGROUND OF THE INVENTION

Illumination based on light emitting diode (LED) has become an effective means for producing the multicolor lighting effects, especially for a dynamic display. Now, the techniques of producing various colors from red light, green light, blue light or more lights with base colors, have been developed.

Nevertheless, there are some problems existing in the application of LED light source, for example, performance of the LED may vary with temperatures and time, as a result, space/color maintenance or human eyes' sensing requirement in some situations could not be achieved. There are some control solutions in the prior art using negative feedback to overcome these problems.

For example, in a negative feedback intensity/color controlled light source, a flux sensor or color sensor is used to detect the output light and the detected result is compared with a pre-calibrated reference. Then an error between the detected result and the pre-calibrated reference is further dealt with the control algorithm and is used to determine the driving current of the LEDs either by means of pulse width modulation or amplitude modulation. In this way, the detected results can be kept to accord with the pre-calibrated reference, and the output illumination intensity or color is accordingly kept steady.

However, there are some problems existing in the prior art. For example, for some solutions, different lighting segments are usually detected in different time periods, which may cause the detected results not real-time. Furthermore, a plurality of sensors may be needed to meet one sensor for one LED array, which may bring side effect on the structure design and cost control of the illumination system. Individual differences among different sensors, as well as differences of the changes of detection performance (e.g. performance attenuation) varying with time among different sensors may lead to differences in the close-loop controlling effects of the illumination system, which is expected to be eliminated in the actual application.

SUMMARY OF THE INVENTION

The invention provides a method and system of controlling illumination characteristics of a plurality of lighting segments.

According to one aspect of the invention, a method of controlling illumination characteristics of a plurality of lighting segments is provided, and the method comprises steps of: providing driving currents to each lighting segment; detecting an illumination intensity and/or color of lights emitted from each lighting segment; and adjusting the driving currents of each lighting segment respectively with a set of driving signals so as to adjust the illumination intensity and/or color of each lighting segment in accordance with an predetermined illumination setting, wherein each set of driving signals has a unique period feature which is distinguished from that of other sets of driving signals corresponding to other lighting segments, and each set of driving signals is in response to the detected illumination intensity and/or color of the light emitted from each corresponding lighting segment.

In this invention, the driving signals with a unique period feature are used to adjust the driving currents of each lighting segment, thus the lights emitted from each lighting segment have different period (frequency) feature and the detected signals have the unique period (frequency) feature accordingly, therefore, signals of each lighting segment can be detected at the same time and can be identified exactly.

According to one embodiment of the method provided by the invention, the detecting step comprises sub-steps of: detecting an mixed illumination intensity and/or color of a combination of at least part of the lights emitted from each lighting segment, by using one sensor, that is a common sensor; and identifying respective illumination intensity and/or color of lights emitted from each lighting segment from the mixed illumination intensity and/or color.

In the prior arts, a plurality of sensors may be used to detect illumination intensity and/or color of a plurality of lighting segments, even each lighting segment is equipped with one sensor. However, since there are individual performance differences among different sensors, and there also exist performance attenuation differences varying with time among different sensors, such controlling could hardly achieve the best effect. In the aforesaid embodiment of the invention, only one common sensor is used to detect illumination intensity and/or color of all lighting segments, which can overcome the aforesaid limitation of the prior arts and provides uniform detected results. Since the performance attenuation of the common sensor brings the same effect to each lighting segment, the controlling effects can be kept in a stable level.

According to the second aspect of the invention, there is provided a light guide means, comprising: a light guide and a plurality of light deflection units, wherein the plurality of light deflection units are located on one same surface of the light guide along the extending direction of the light guide, and are configured such that each light deflection units is capable of deflecting at least part of the lights coming from its opposite side to one same direction of the extending direction of the light guide.

According to the third aspect of the invention, there is provided an illumination system, comprising: a plurality of lighting segments, a detecting subsystem and a controller; wherein the detecting subsystem is configured to detect an illumination intensity and/or color of lights emitted from each lighting segment; and the controller is configured to receive output signals of the detecting subsystem representing illumination intensity and/or color of lights emitted from each lighting segment and to generate sets of driving signals to respectively adjust the driving currents of each lighting segment in response to the output signals, so as to adjust the illumination intensity and/or color of each lighting segment in accordance with an predetermined illumination setting; wherein each set of driving signals has a unique period feature which is distinguished from that of other sets of driving signals corresponding to other lighting segments.

In one embodiment of the illumination system of the invention, the detecting subsystem comprises a common sensor, which is configured to detect an mixed illumination intensity and/or color of a combination of at least part of the lights emitted from each lighting segment; the detecting subsystem further comprises an identifying unit, which is configured to identify respective illumination intensity and/or color of lights emitted from each lighting segment from the mixed illumination intensity and/or color.

In one embodiment of the illumination system of the invention, the detecting subsystem further comprises a common light guide means, which is configured to guide at least part of the lights emitted from each lighting segment to the common sensor.

BRIEF DESCRIPTION OF THE DRAWINGS

Other features, purposes and advantages of the present invention will become more apparent from the following detailed description of non-limiting exemplary embodiments taken in conjunction with the accompanying drawings, in which.

Wherein, the identical or similar reference signs indicate the identical or similar step feature or device (module).

DETAILED DESCRIPTION OF EMBODIMENTS

Figure 1:
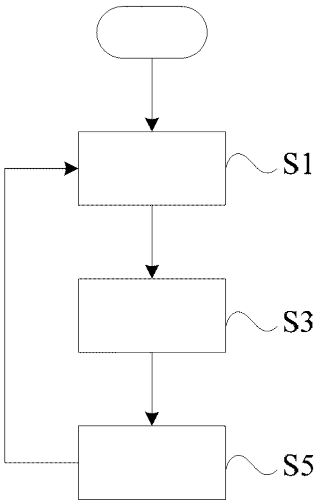
FIG. 1 illustrates a flow chart of the method of controlling illumination characteristics of a plurality of lighting segments, according to an embodiment of the invention.

FIG. 1 illustrates a flow chart of the method of controlling illumination characteristics of a plurality of lighting segments, according to one embodiment of the invention.

In step S1, driving current is provided to each lighting segment, respectively.

In step S3, an illumination intensity and/or color of lights emitted from each lighting segment is detected, respectively. For example, if each lighting segment only comprises one monochromatic LED array, then an intensity sensor can be used to merely detect the illumination intensity of lights emitted from each lighting segment. As is well known, two or more base colors can be mixed to get various mixed colors by adjusting the percentage (or contribution) of different base colors. If each lighting segment comprises a plurality of lighting sources with different base colors, then a color sensor can be used to detect an illumination intensity and/or color of lights emitted from each lighting segment.

In step S5, the driving current of each lighting segment is adjusted respectively with a set of driving signals, wherein each set of driving signals has a unique period feature which is distinguished from that of other sets of driving signals corresponding to other lighting segments, and each set of driving signals is in response to the detected illumination intensity and/or color of the light emitted from corresponding lighting segment, so as to adjust the illumination intensity and/or color of each lighting segment in accordance with an predetermined illumination setting. For example, the period of the first set of driving signals corresponding to the first lighting segment can be set as 2 ms, the period of the second set of driving signals corresponding to the second lighting segment can be set as 3 ms, the period of the third set of driving signals corresponding to the third lighting segment can be set as 7 ms, etc. The predetermined illumination setting can vary with different circumstances. For example, if each lighting segment can only emit white light, then the predetermined illumination setting can be to require each lighting segment at an approximately identical illumination intensity so as to provide stable and uniform illumination; if each lighting segment comprises a plurality of LED arrays of different base colors, then the illumination setting can be to require the lights emitted from each lighting segment to form a specific pattern; of course, the illumination setting can also be changeable with time, so that each lighting segment can form changeable patterns, which is similar to a movie projection.

A closed-loop control is formed by circularly executing the steps S1, S3, S5. By detecting the characteristics of lights emitted from each lighting segment, the contribution of different base colors can be adjusted to achieve color control on lights emitted from the light segments. In one embodiment of the invention, by detecting the illumination intensity and color of lights emitted from each lighting segment, a detected signal can be attained, which can be used to compare with a certain predetermined color setting to obtain a feedback information, the feedback information can be converted into driving signals used to adjust the driving currents of each lighting segment, thereby the desired color can be obtained. The method of the invention comprises driving signals with a unique period feature to adjust the driving currents of each lighting segment, so the lights emitted from each lighting segment also have unique period feature and the detected signals of each lighting segment have a unique period (frequency) feature as well, therefore, the illumination intensity and/or color of each lighting segment can be detected at the same time and be identified exactly.

Figure 2:
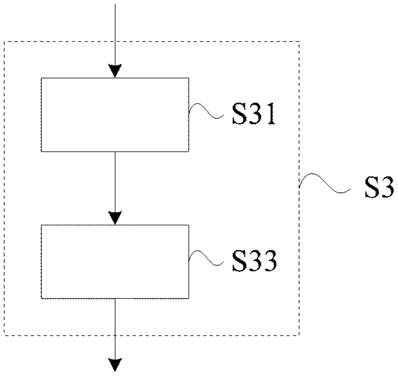
FIG. 2 illustrates a flow chart of the detecting step in the method, according to an embodiment of the invention.

FIG. 2 illustrates a flow chart of the detecting step in the method, according to an embodiment of the invention. As shown therein, the detecting step S3 in the embodiment comprises a detecting sub-step S31 and an identifying sub-step S33.

In the detecting sub-step S31, a mixed illumination intensity and/or color of a combination of at least part of the lights emitted from each lighting segment is detected by using a common sensor. In the identifying sub-step S33, respective illumination intensity and/or color of lights emitted from each lighting segment is identified from the mixed illumination intensity and/or color. In the detecting sub-step S31, the at least part of the lights emitted from each lighting segment is guided to the common sensor via a common light guide means. Since each set of driving signals respectively corresponding to each lighting segment has different period feature, thus the lights emitted from each lighting segment have unique period feature as well, therefore, output of the common sensor is a superposition signal of electrical signals with different period feature. Therefore, in the identifying sub-step S33, the illumination intensity and/or color of each lighting segment could be extracted from the common sensor's output signals by means of analogue signal filtering or digital signal processing etc.

Figure 3:
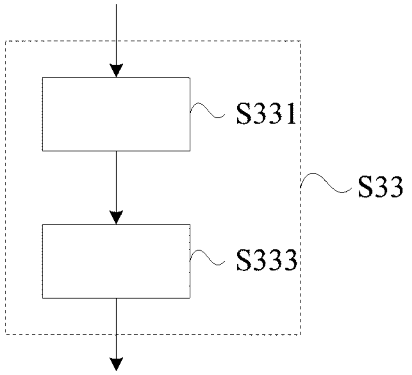
FIG. 3 illustrates a flow chart of the identifying sub-step in the method, according to an embodiment of the invention.

FIG. 3 illustrates a flow chart of the identifying sub-step in the method, according to an embodiment of the invention. As shown therein, the identifying sub-step S33 in the embodiment comprises sub-steps S331 and S333. In the sub-step S331, the sensor's output signal representing the combined illumination intensity and/or color of a plurality of lighting segments is converted into a digital signal via an analog/digital converter (A/D converter). In the sub-step S333, the aforesaid digital signal is processed via a digital signal processor (DSP), so as to distinguish signals respectively corresponding to illumination intensity and/or color of each lighting segment. For example, but not limited to, the processing by the digital signal processor may comprise implementing discrete Fourier transform on the digital signal from A/D converter, so that the digital signal can be processed in frequency domain. Those skilled in the art should understand, it is feasible that other known transform methods are used to process the digital signal from A/D converter to make signal being processed in transformation domain.

In another embodiment of the method of the invention, the detecting step S3 comprises a sub-step of using a plurality of light guide means to respectively guide at least part of the lights emitted from each lighting segment to a common sensor. For example, an optical fiber can be used as the light guide means, at least part of the lights emitted from each lighting segment can be respectively transmitted to the common sensor through one of a plurality of optical fibers. The common sensor is used to detect the illumination intensity and/or color of a combination of lights from each lighting segment.

According to one embodiment of the method of the invention, each lighting segment only comprises one LED array, the driving current of LED array of each lighting segment can be respectively adjusted by an independent driving signal, each driving signal has period feature different from that of others.

According to another embodiment of the method of the invention, each lighting segment comprises a plurality of LED arrays, color of each LED array in the same lighting segment can be different from each other, the driving current of each LED array in the same lighting segment can be adjusted by an independent driving signal in the same set of driving signals, each driving signal in the same set has the same period feature, each set of driving signals has period feature different from that of other sets.

Figure 4:
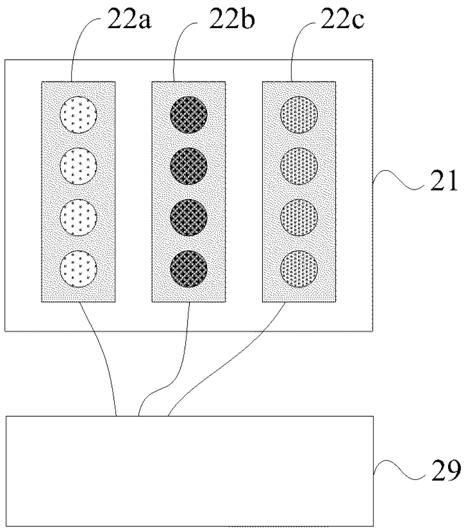
FIG. 4 illustrates a schematic diagram of the lighting segment, according to an embodiment of the invention.

FIG. 4 illustrates a schematic diagram of the lighting segment, according to an embodiment of the invention. The lighting segment 21 in the embodiment comprises three LED arrays 22*a*, 22*b*, 22*c*, such three LED arrays have different colors, and each LED array consists of a plurality of LED particles. Controller 29 is used to provide a set of driving signals to the lighting segment 21, the set of driving signals comprises three independent driving signals with the same period feature, which are respectively used to adjust the driving currents of LED arrays 22*a*, 22*b*, 22*c*, so as to adjust respective illumination intensity of those arrays. Each driving signal could be, for example, but not limited to, amplitude modulated signal or duty cycle modulated signal. By adjusting illumination intensity of LED arrays with different base colors in the lighting segment 21, color and intensity of lights emitted from the lighting segment 21 can be adjusted. For example, but not limited to, the color of LED arrays 22*a*, 22*b*, 22*c* can be selected from red, green or blue.

Figure 5:
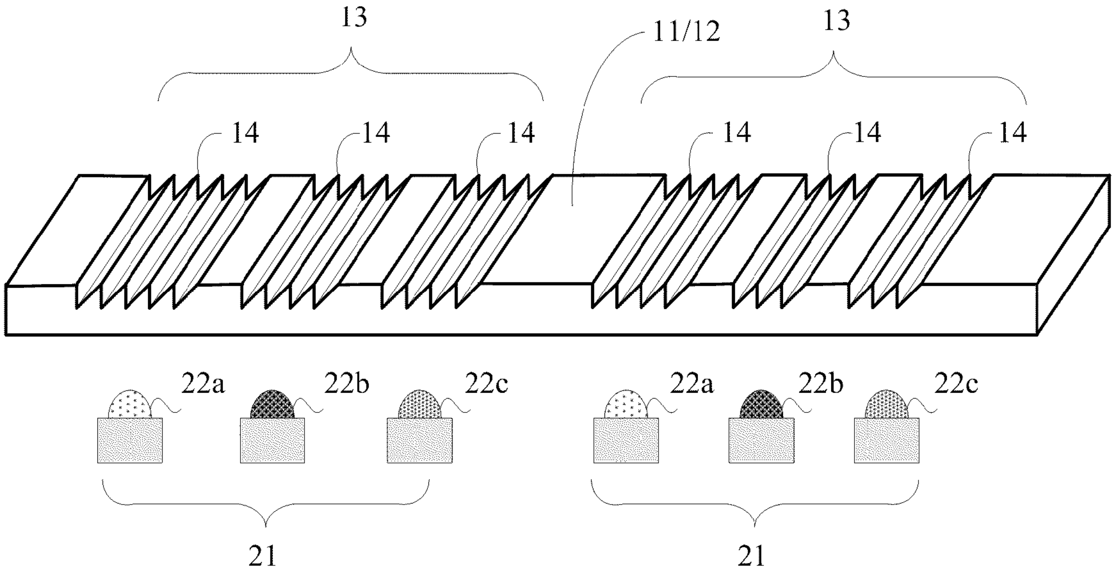
FIG. 5 illustrates a schematic diagram of the structure of the light guide means and its positional relation with LED arrays, according to an embodiment of the invention.
Figure 6:
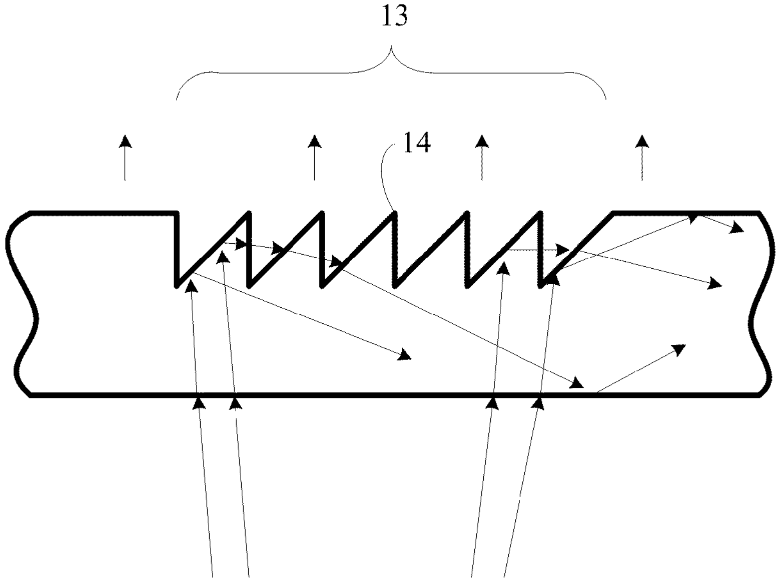
FIG. 6 illustrates a partial sectional view of the light guide means, according to an embodiment of the invention.

FIG. 5 illustrates a schematic diagram of the structure of the light guide means and its positional relation with LED arrays, according to an embodiment of the invention. FIG. 6 illustrates the partial sectional view of the light guide means. Light guide means 11 mainly comprises a light guide 12, a plurality of light deflection units 13 located on one surface of the light guide 12, along the extending direction of the light guide 12. A plurality of lighting segments 21 are placed beneath the light guide 12, under the location of the light deflection units 13. Each lighting segment 21 comprises a plurality of LED arrays 22*a*, 22*b*, 22*c*. As shown in FIG. 6, arrowheads therein indicate lights, which are from the opposite side of the light deflection units 13, wherein part of the lights penetrate through light guide 12 and travel to the other side of the light guide 12, another part of the lights are deflected to a extending direction of the light guide 12 by the light deflection units 13, transmission of the lights deflected to the extending direction inside the light guide 12 is similar to internal total reflection. Each light deflection unit 13 deflects a part of the lights of each corresponding lighting segment 21 to the same direction of the extending direction along the light guide 12, lights deflected to the same direction can be used for detecting, where the end of the light guide 12 at this direction can be called as detecting end.

In this embodiment, light deflection unit 13 preferably consists of a plurality of V-Cut prism structures 14 with a sawtooth-like shape, based on the design of number of the prisms, size and tilt angle of each prism, it is convenient to control the percentage of light intensity deflected by the light deflection units 13. Light deflection unit 13 can be built by a plurality of V-Cut prism structures 14 lining up discontinuously or incompletely continuously, as shown in FIG. 5; Light deflection unit 13 can also be built by a plurality of V-Cut prism structures 14 lining up successively. Of Course, each light deflection unit 13 can be built by prism structures with trapezia shape, circular arc shape or other shapes. Number of the prisms and size of each prism for each light deflection unit 13 are designed so as that a pre-determined percentage of lights coming from its corresponding lighting segment are deflected to the same direction.

The farther a light deflection unit is away from the detecting end, the more losses the lights deflected by the light deflection unit would suffer, because of the further distances of transmission and the dispersion of other light deflection unit on the way, so numbers of the prisms comprised in each light deflection unit are not completely the same. Those light deflection units with closer distance to the detecting end comprise less prisms; while those light deflection units with further distance to the detecting end comprise more prisms. The aforesaid design allows the light intensities of lights which are deflected by each light deflection unit and transmitted to the detecting end to be almost the same, so as to lower the requirement of the sensor's detecting scope.

Light guide 12 could be made of at least one of the following materials: polyethylene, polyamide, polypropylene, polymethylmethacrylate (PMMA), polycarbonate (PC), polystyrene (PS). The light guide 12 can also be made of silicon dioxide or any other materials used for fabricating optical glass. As is well known, all the aforesaid materials have good capability of light transmission.

Figure 7:
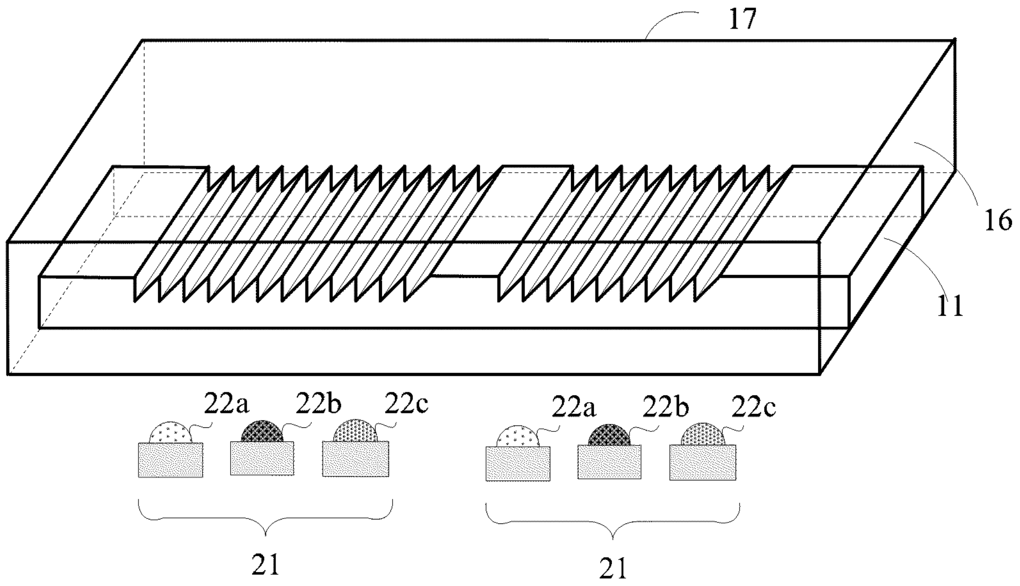
FIG. 7 illustrates a stereoscopic schematic diagram of the light guide, according to an embodiment of the invention.

As shown in FIG. 7, preferably, there is a covering layer 17 located on top of the light guide 12, the covering layer 17 is usually made of PMMA or PC and used for protection. There is a gap 16 between the covering layer 17 and the light guide 12, the gap 16 is filled with material commonly selected from materials with lower refractive index than that of the light guide 12, so as to insure the effects of internal total reflection of the light guide 12 along the extending direction.

Figure 8:
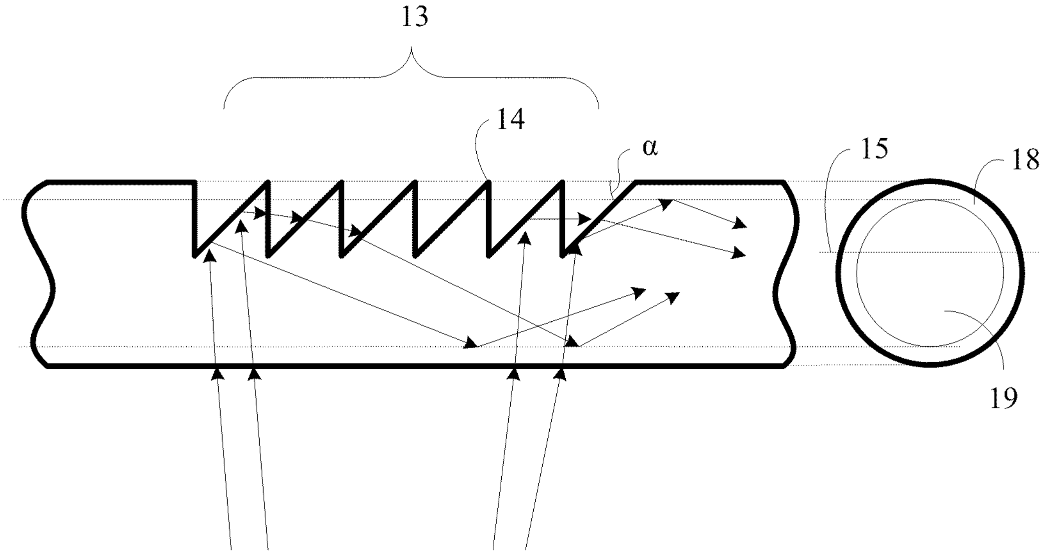
FIG. 8 illustrates a side cutaway view and a sectional view of the light guide, according to an embodiment of the invention.

FIG. 8 illustrates a side cutaway view and a sectional view of the light guide, according to another embodiment of the invention. Light guide in the embodiment is made of optical fiber, comprising an optical fiber core 19 and a jacket layer of optical fiber 18. Light deflection units 13 are located on a same side of the optical fiber, part of the lights coming from the other side of the optical fiber are deflected to the same direction of the extending direction along the optical fiber. In the embodiment, each light deflection unit 13 consists of several prism structures with a side profile of V-cut as well, reference sign 15 therein represents side dissection hatching line of the optical fiber. If refraction coefficients of optical fiber core and jacket layer of optical fiber are respectively 1.492 and 1.417, the threshold angles of total reflection of optical fiber core and jacket layer of optical fiber are respectively 42° and 44°, including angle α of prism structures can be set larger than the two threshold angles, for example, set at 46°, so that part of the lights coming from side of the optical fiber are deflected and transmitted inside of the optical fiber.

Normally, the illumination systems implementing any aforesaid method will be configured with corresponding devices to accomplish the purposes of the invention, each device is respectively used to implement each step or sub-step of the aforesaid method.

Figure 9:
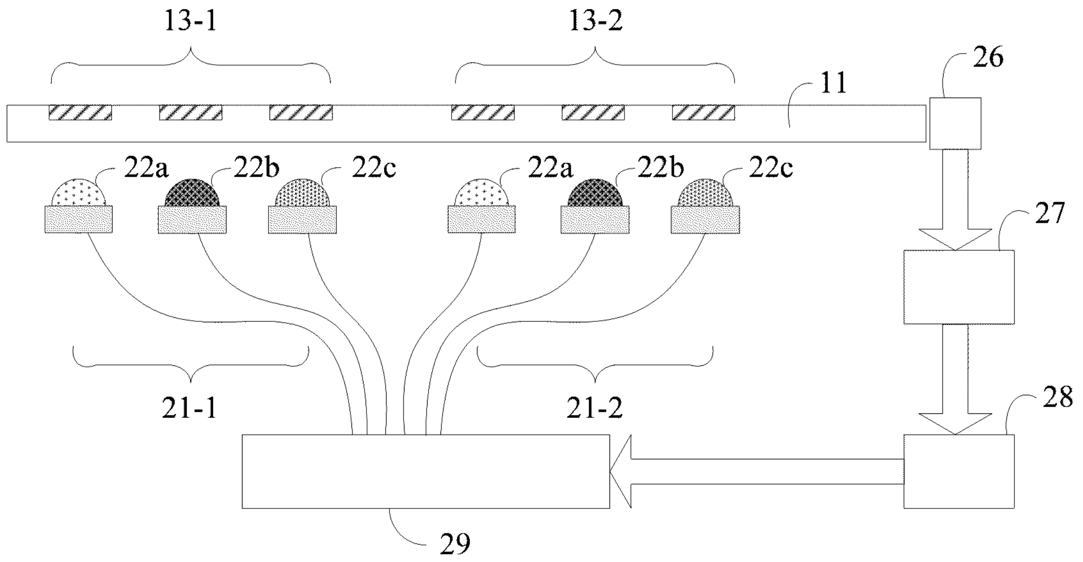
FIG. 9 illustrates a structural schematic diagram of the illumination system, according to an embodiment of the invention.

FIG. 9 illustrates a structural schematic diagram of the illumination system, according to an embodiment of the invention, as shown therein, the illumination system comprises: a light guide means 11, a common sensor 26, an A/D converter 27, a digital signal processor (DSP) 28, a controller 29, a plurality of lighting segments 21 although only two lighting segments 21-1 and 21-2 are illustrated therein.

In the embodiment, each lighting segment 21 comprises three LED arrays **22*a*, 22*b* and 22*c*. The LED array 22*a* emits red light, the LED array 22*b* emits green light, the LED array 22*c* emits blue light. The common sensor 26** is a color sensor, which can distinguish lights of three colors, namely the red ones, the green ones and the blue ones. In other embodiments of the invention, each lighting segment could comprises LED arrays with two or more different colors, the color of each LED array is not limited to red, green and blue, and the base colors which can be distinguished by the color sensor are not limited to red, green and blue, too.

Controller 29 generates a set of three independent driving signals to adjust the driving currents of three LED arrays of each lighting segment, respectively. Each set of driving signals has different period feature, for example, the period of the driving signals of the first lighting segment 21-1 is 2 ms, the period of the driving signals of the second lighting segment 21-2 is 3 ms, etc. Preferably, all driving signals are amplitude modulated sine signals. For example, all driving signals of three LED arrays of the first lighting segment 21-1 are amplitude modulated sine signals with frequency of 0.5 kHz, all driving signals of three LED arrays of the second lighting segment 21-2 are amplitude modulated sine signals with frequency of 0.33 kHz, etc.

Light guide means 11 can be selected from one of the light guide means described above with reference to the FIG. 5 and FIG. 7.

Part of the lights emitted from red LED array **22*a* of all lighting segments 21 are deflected by deflection means, and are transmitted and superposed in the light guide means 11, the common sensor 26 then detects a light intensity of the mixed red and output an electrical signal of red light. Because each red LED array 22*a*** can be respectively adjusted by sine signals with different frequencies, thus the detected electrical signal of red light comprises various frequency elements, wherein the main frequency elements comprises 0.5 kHz, 0.33 kHz, i.e. the frequency of the driving signal of each lighting segment, and their frequency multipliers. These frequency multiplier signals are mainly caused by nonlinear characteristic of light emitting and detecting.

A/D converter 27 converts the detected electrical signal of red light into a digital signal and sends the digital signal to DSP28 for being processed. Processing in DSP28 comprise discrete Fourier transform, digital filtering etc, so as to distinguish the intensity of the red LED array of each lighting segment. Because the frequency of the driving signals of each lighting segment is unique, so the processing of filtering, identifying is accordingly easy. For example, the signals with frequency element of 0.5 kHz and its frequency multipliers are identified as coming from the red LED array of the first lighting segment 21-1; the signals with frequency element of 0.33 kHz and its frequency multipliers are identified as coming from the red LED array of the second lighting segment 21-2, etc. The frequency of the driving signals of each lighting segment can be set specially, so as to decrease the mutual interference of their frequency multiplier elements as much as possible. The energy of each frequency element coming from the red LED array of the first lighting segment 21-1 add up to its detected illumination intensity, the illumination intensity of the red LED array of other lighting segments can be obtained by similar means. The detecting and identifying of each green LED array and each blue LED array are similar to that of each red array.

Controller 29 compares the detected illumination intensity of each LED array with a predetermined illumination setting, and adjusts the driving signals of each LED array according to the result of comparison.

In general, lights emitted from each LED array are mainly used for illumination, the percentage of lights deflected for detecting therein is less than 5%, influence to the illumination effects sensed by human eye which is caused by such a percentage of light splitting (the percentage of lights used for detecting in the total lights emitted from the LED array) can be ignored. Preferably, the controller 29 can also compensate the driving signals of each LED array according to the percentage of light splitting of each LED array.

In other embodiments of the illumination systems of the invention, each lighting segment 21 only comprises one LED array, such as one LED array emitting white lights, in this situation the common sensor 26 can only be used to detect light intensity.

In other embodiments of the illumination systems of the invention, A/D converter 27, digital signal processor 28 can be replaced by circuits or devices like an analog filter.

In other embodiments of the illumination systems of the invention, the illumination system comprises a plurality of light guide means, e.g. optical fiber, and each lighting segment is equipped with a light guide means, respectively. Part of the lights emitted from each lighting segment can be transmitted to the common sensor via one of the plurality of light guide means, and illumination intensity and/or color of the mixed lights can be sensed by the common sensor.

Figure 10:
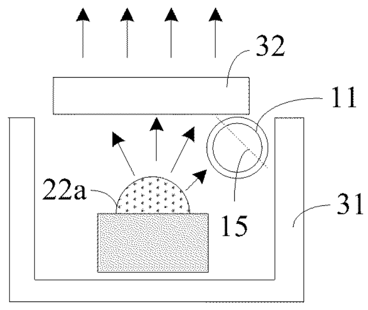
FIG. 10 illustrates a sectional schematic diagram of the illumination system, according to an embodiment of the invention.

FIG. 10 illustrates a sectional schematic diagram of the illumination system, according to an embodiment of the invention. The illumination system of the embodiment has a lamp body with a shape of a long strip, comprising: a housing 31, a cover plate 32, a light guide means 11, a plurality of LED arrays, etc. Most of the lights emitted from the LED arrays penetrate through the cover plate 32 to be used for illumination, a small part of lights are deflected by the light guide means 11 to be used for detecting. The light guide means 11 is made of optical fiber in the embodiment, which is located sideward above the LED arrays and near an edge of the housing. The side dissection hatching line 15 of prism structures of the light guide means 11 is set to be oblique, substantially perpendicular to the lights directly emitted from each LED array.

Figure 11:
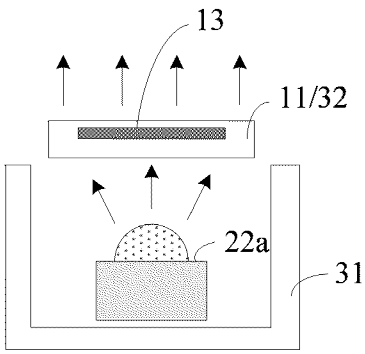
FIG. 11 illustrates a sectional schematic diagram of the illumination system, according to an embodiment of the invention.

FIG. 11 illustrates a sectional schematic diagram of the illumination system, according to an embodiment of the invention. The illumination system in the embodiment has a lamp body with a shape of a long strip, comprising: a housing 31, a cover plate 32, a plurality of LED arrays, etc. Light guide means 11 is incorporated with the cover plate 32 as a whole, most of the lights emitted from LED arrays penetrate through the cover plate 32 to be used for illuminating, a part of lights are deflected by the light deflection units 13 of the light guide means 11 to the sensor and used for detecting.

Figure 12:
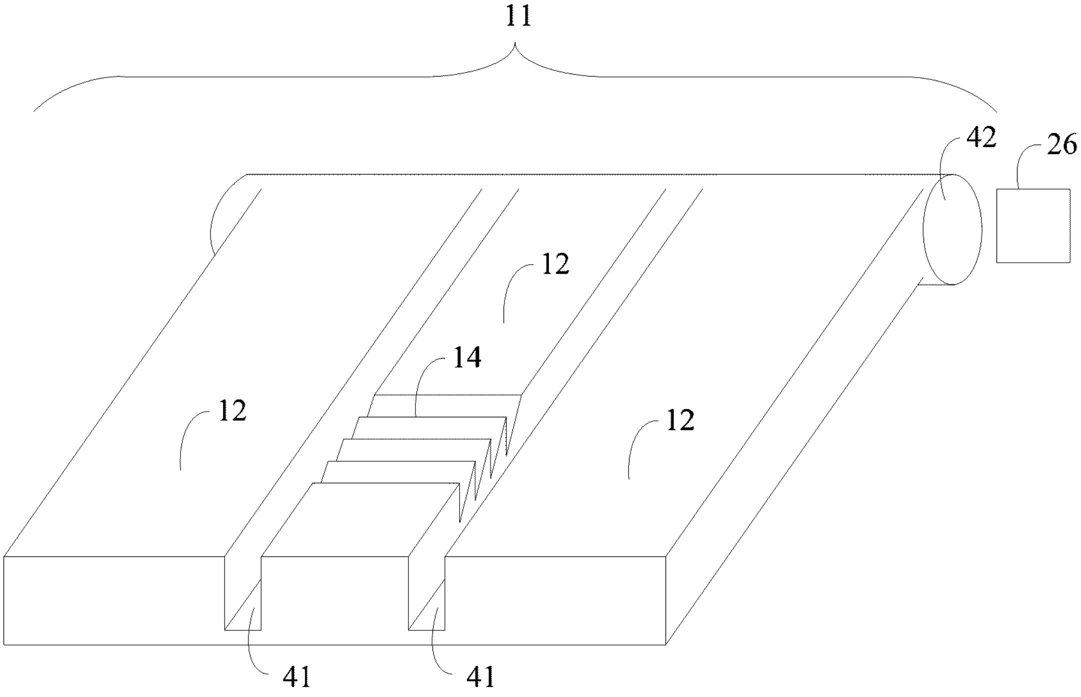
FIG. 12 illustrates a schematic diagram of the light guide means, which can be used in an illumination system with surface distribution, according to an embodiment of the invention.

FIG. 12 illustrates a schematic diagram of the light guide means, according to an embodiment of the invention. The light guide means can be used for the illumination system with surface distribution. As shown therein, the light guide means 11 comprises a plurality of strip-like light guides 12 arranged in parallel. The adjacent strip-like light guides 12 are separated from each other by the grooves 41, the grooves 41 can be filled with materials with lower refractive index than that of light guides 12. One end of each light guide 12 is connected to an optical device 42. All the lights coming from each light guide 12 could be diffusely reflected in the optical device 42 and be guided to one end of the optical device 42, so as to be detected by the common sensor 26. The illumination system using such light guide means can provide illumination with surface distribution.

The embodiments of the invention are described above, but the invention is not limited to these specific systems, devices or materials, those skilled in the art can make various changes or modifications within the scope of the attached claims.

What is claimed is:

1. A method of controlling illumination characteristics of a plurality of lighting segments, comprising steps of:

providing driving currents to each lighting segment; detecting an illumination intensity and/or color of lights emitted from each lighting segment;

adjusting the driving currents of each lighting segment respectively with a set of driving signals so as to adjust the illumination intensity and/or color of each lighting segment in accordance with an predetermined illumination setting, wherein each set of driving signals has a unique period feature which is distinguished from that of other sets of driving signals corresponding to other lighting segments, and each set of driving signals is in response to the detected illumination intensity and/or color of the light emitted from each corresponding lighting segment;

wherein, each lighting segment comprises at least one independently controlled LED array of different color from that of the other LED arrays in the same lighting segment, and the driving current of each LED array is adjusted by an individual driving signal in the same set of driving signals, each driving signal in the same set comprises the same period feature; and wherein, the individual driving signal is amplitude modulated signal or duty cycle modulated signal.

2. The method according to claim 1, wherein, the detecting step comprises sub-steps of:

detecting an mixed illumination intensity and/or color of a combination of at least part of the lights emitted from each lighting segment, by using a common sensor; and identifying respective illumination intensity and/or color of lights emitted from each lighting segment from the mixed illumination intensity and/or color.

3. The method according to claim 2, wherein, the sub-step of detecting comprises:

guiding at least part of the lights emitted from each lighting segment to the common sensor by using a common light guide means.

4. The method according to claim 2, wherein, the sub-step of identifying comprises:

converting the sensor's output signals representing the mixed illumination intensity and/or color into a digital signal by using an A/D converter and then executing discrete Fourier transform on the digital signal by using a processor to obtain the respective illumination intensity and/or color of lights emitted from each lighting segment.

5. An illumination system, comprising:

a plurality of lighting segments;

a detecting subsystem configured to detect an illumination intensity and/or color of lights emitted from each lighting segment;

a controller configured to receive output signals of the detecting subsystem representing the illumination intensity and/or color of lights emitted from each lighting segment and to generate a plurality of sets of driving signals to respectively adjust the driving currents of each lighting segment in response to the output signals, so as to adjust the illumination intensity and/or color of the lights emitted from each lighting segment in accordance with a predetermined illumination setting, wherein each set of driving signals has a unique period feature which is distinguished from that of other sets of driving signals corresponding to other lighting segments;

wherein, the detecting comprises a common sensor, which is configured to detect an mixed illumination intensity and/or color of a combination of east part of the lights emitted from each lighting segment;

the detecting subsystem further comprises an identifying unit, which is configured to identify respective illumination intensity and/or color of lights emitted from each lighting segment from the mixed illumination intensity and/or color;

wherein, the detecting subsystem further comprises a common light guide means, which is configured to guide at least part of the lights emitted from each lighting segment to the common sensor; and wherein, the common light guide means comprises:

a light guide; and a plurality of light deflection units, which are located on one same surface of the light guide and along the extending direction of the light guide, each light deflection unit comprises a plurality of V-Cut prism structures, number of the prisms and size of each prism for each light deflection unit are designed such that a pre-determined percentage of lights from the lighting segment corresponding to the light deflection unit are deflected to the sensor.

6. An illumination system, comprising:

a plurality of lighting segments;

a detecting subsystem configured to detect an illumination intensity and/or color of lights emitted from each lighting segment;

a controller configured to receive output signals of the detecting subsystem representing the illumination intensity and/or color of lights emitted from each lighting segment and to generate a plurality of sets of driving signals to respectively adjust the driving currents of each lighting segment in response to the output signals, so as to adjust the illumination intensity and/or color of the lights emitted from each lighting segment in accordance with a predetermined illumination setting, wherein each set of driving signals has a unique period feature which is distinguished from that of other sets of driving signals corresponding to other lighting segments;

wherein, each lighting segment comprises at least one independently controlled LED array of different color from that of the other LED arrays in the same lighting segment, and the driving current of each LED array is adjusted by an individual driving signal in the same set of driving signals, each driving signal in the same set comprises the same period feature.

7. The illumination system according to claim 6, wherein, the identifying unit comprises:

an A/D converter configured to convert the output signals of the sensor representing the mixed illumination intensity and/or color into a digital signal; and a processor configured to execute discrete Fourier transform on the digital signal to obtain the respective illumination intensity and/or color of the lights emitted from each lighting segment.

8. A method of controlling illumination characteristics of a plurality of lighting segments, comprising steps of:

providing driving currents to each lighting segment;

detecting an illumination intensity and/or color of lights emitted from each lighting segment;

adjusting the driving currents of each lighting segment respectively with a set of driving signals so as to adjust the illumination intensity and/or color of each lighting segment in accordance with an predetermined illumination setting, wherein each set of driving signals has a unique period feature which is distinguished from that of other sets of driving signals corresponding to other lighting segments, and each set of driving signals is in response to the detected illumination intensity and/or color of the light emitted from each corresponding lighting segment;

wherein, each lighting segment comprises at least one independently controlled LED array of different color from that of the other LED arrays in the same lighting segment, and the driving current of each LED array is adjusted by an individual driving signal in the same set of driving signals, each driving signal in the same set comprises the same period feature.

* * * * *